Dec. 27, 1927.
C. REGER
1,653,781
ANTISKIDDING DEVICE FOR VEHICLE WHEELS
Filed Sept. 27, 1926
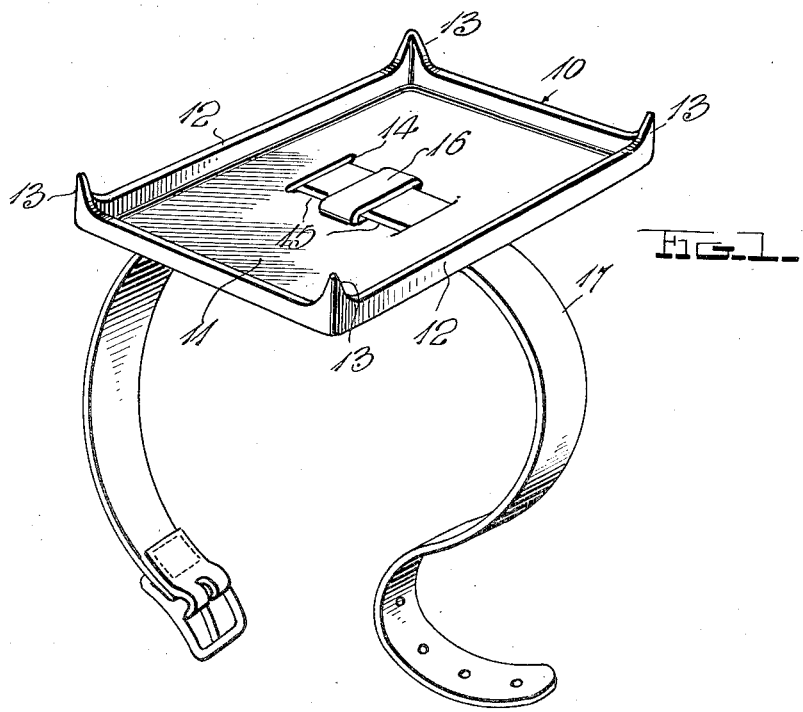
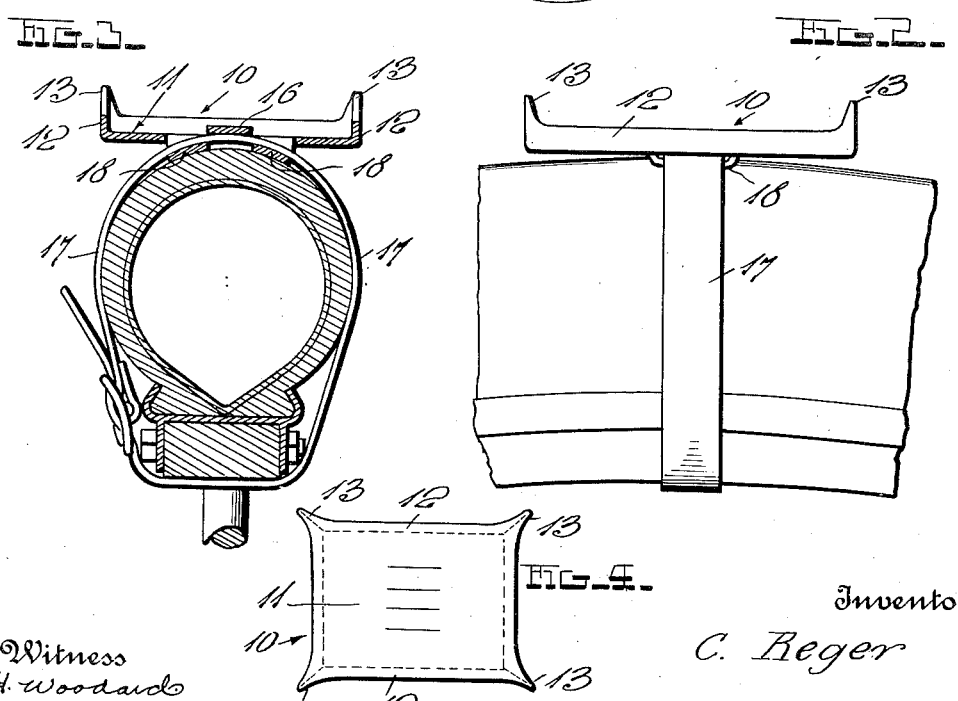
Inventor
C. Reger Patented Dec. 27, 1927.

1,653,781

UNITED STATES PATENT OFFICE.

CONRAD REGER, OF NEW YORK, N. Y.

ANTISKIDDING DEVICE FOR VEHICLE WHEELS.

Application filed September 27, 1926. Serial No. 138,023.

This invention relates to anti-skidding grip treads or mud lugs to be attached to a drive wheel of a self-propelled vehicle to increase the traction thereof.

A primary object of the invention is to provide a device of this character which may be cheaply constructed and readily applied, and when applied will effectively operate as a traction element to enable the vehicle equipped therewith to be driven through mud, deep sand or soft earth which would ordinarily be impossible. The invention further contemplates the provision of a device of this character embodying a supporting base in the form of an angular plate having integral circumferential flanges with biting spurs extending from the edges of the flanges in the same direction therewith and having loops formed in the body of the plate to receive the attaching elements.

With the above and other objects in view, the present invention resides in the novel features of construction, formation, combination and arrangement of parts to be hereinafter more fully described, claimed and illustrated in the accompanying drawing forming a part of the present application, and in which:—

Fig. 1 represents a perspective view of the device constituting the invention.

Fig. 2 is a side elevation of a portion of a pneumatic tired wheel with this improved mud lug applied.

Fig. 3 is a transverse section taken on the line 3—3 of Fig. 2.

Fig. 4 is a plan view of the blank from which the lug is constructed.

In the drawing similar characters of reference indicate corresponding parts in all the figures.

In the embodiment illustrated, the antiskid mud lugs or caulks 10 are shown applied to an ordinary vehicle wheel 1 provided with a pneumatic tire 2 and when the device is to be applied to a spoked wheel, individual lugs or caulks may be employed fastened separately to the wheel, but when applied to a disc wheel, side chains or similar means are used for connecting and securing the lugs to the tire.

The lugs 10 constituting the invention each comprises an angular metal plate 11 of sufficient rigidity to prevent bending and which is preferably made rectangular as shown, being equipped around the edges thereof with flanges 12 formed integral with the plate and provided at the corners where the flanges join with biting spurs 13 extending in the same direction as the flanges which extend radially or substantially so from the wheel and hence will bite into and engage the sand or mud obtaining a firm grip on the road permitting the vehicle to be driven under its own power without fear of slipping, spinning or skidding.

This plate 11 is preferably stamped out with the edges thereof bent to form the flanges 12 and the corners extended, pointed and crimped to form the spurs 13.

The plate 11 is provided preferably in the center thereof with a plurality of longitudinally extending slits 14 spaced laterally apart, four of said slits being here shown with the material between the end or outermost slits struck outwardly in one direction to form strap-receiving loops 15 while the central portion 16 is struck out in the opposite direction permitting a strap 17 to be passed through these loops and to be moved longitudinally in them to provide for adjustment. The arrangement of the loops or straps 15 and 16 provides a straight passage for the strap 17 to avoid chafing thereof. The outer edges of the loops or straps 15 deflect outwardly forming rounded outturned lips 18 to avoid cutting of the attaching strap by the edges of these members, when the device is applied. This outbending of the lips 18 also facilitates the insertion of the strap, permitting it to be quickly applied when desired.

In use, the device is placed transversely across the tire as shown in Figs. 2 and 3 and the strap 17 which is threaded through the loops 15 and 16 is extended under the wheel rim and secured by a buckle or other suitable fastening. This arrangement is used when spoke wheels are employed and any desired number of the lugs or caulks may be used as may be found necessary.

When disk wheels are used, it will of course be necessary to employ chains extended around the sides of the tire for connecting the mud lugs and which may be accomplished in a manner similar to that shown in applicant's former Patent No. 1,213,949, dated Jan. 30, 1917, metal attaching straps 2 as shown in said patent being substituted for the leather strap 17 as shown herein and these straps 2 have hooks 3 at their terminals which are designed to be engaged with side pieces 12 preferably but not necessarily made in the form of coiled springs.

I claim:—

An anti-skidding device or mud lug for vehicle tires comprising a metal plate having biting elements for engaging the surface over which the wheel is to pass and provided in the body portion thereof with outstruck loops projecting from opposite sides of said body portion to receive an attaching strap passed therethrough, the outer edges of the outermost loops being deflected to form curved lips to avoid chafing of the strap and permit it to conform to the transverse curvature of the tire.

In testimony whereof I have hereunto affixed my signature.

CONRAD REGER.